(No Model.)

H. HAAK.
MILK STRAINER.

No. 282,189. Patented July 31, 1883.

Witnesses
L. C. Hills.
E. E. Masson.

Inventor.
Henry Haak
By E. P. Stocking
Atty.

UNITED STATES PATENT OFFICE.

HENRY HAAK, OF MYERSTOWN, PENNSYLVANIA.

MILK-STRAINER.

SPECIFICATION forming part of Letters Patent No. 282,189, dated July 31, 1883.

Application filed April 28, 1883. (No model.)

*To all whom it may concern:*

Be it known that I, HENRY HAAK, a citizen of the United States, residing at Myerstown, in the county of Lebanon and State of Pennsylvania, have invented certain new and useful Improvements in Milk-Strainers, of which the following is a specification, reference being had therein to the accompanying drawings, in which—

Figure 1:
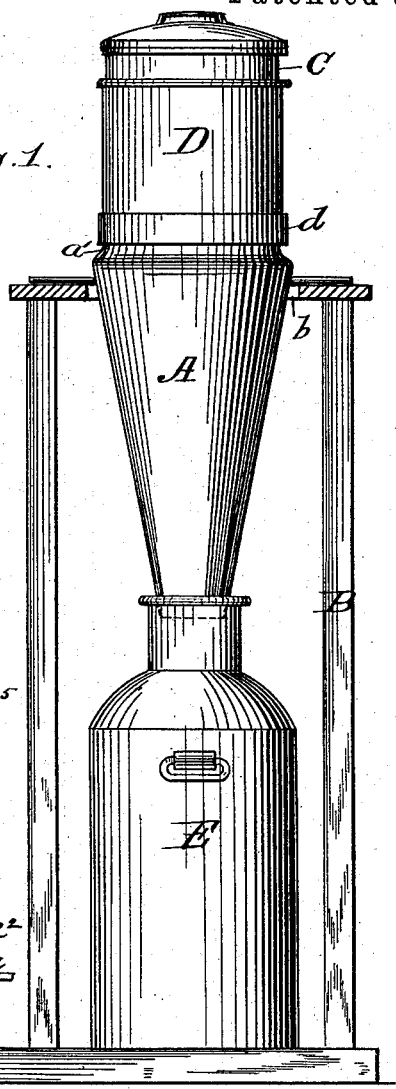
Figure 2:
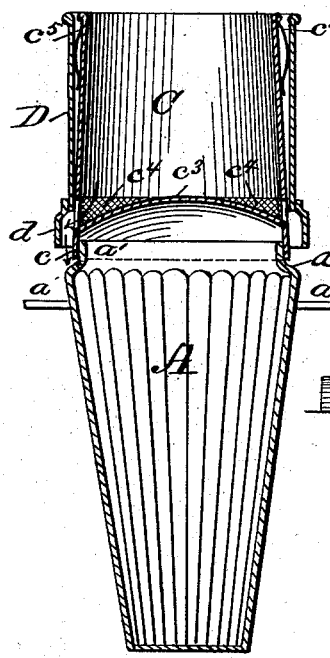

Figure 1 is a side elevation, partly in section, of a milk-strainer constructed in accordance with my invention. Fig. 2 is a vertical section of the same, and Fig. 3 a modification hereinafter described.

Like letters refer to like parts in all the figures.

The object of this invention is to provide means for the cooling and deodorization of milk during the operation of straining the same, as it usually occurs—that is, when the milk is fresh and contains animal heat and odor. Heretofore milk has been strained as rapidly as possible into cans for shipping to creameries, cheese-factories, and more distant destinations, and therefore contains odor and animal heat, which render the milk more liable to rapid deterioration and premature souring.

The principle of operation upon which my invention is based is that of finely subdividing a body of milk into a thin stream, jet, spray, or sheet, and of exposing one side thereof to the air to extract any odor in the milk, and to expose the opposite side thereof to the action or influence of any suitable refrigerative substance, and to continue this principle of operation during the filling of the cans for transportation.

To adapt my invention to practical use, I employ an inverted cone, A, the apex of which is of a size which can be loosely inserted into any ordinary shipping-can (as E) or other desired vessel, and the base of which is provided with a series of supporting-rods, arms, or brackets, $a$, whereby the cone may be supported above the can or vessel upon a framework, B, the top thereof being provided with an opening, $b$, for the reception of the cone. The apex of the cone being closed, it forms a chamber for the reception and the retention of any suitable refrigerative substance, such as ice, water, cool air, or other refrigerative means. The walls or body of the cone may be either plain or corrugated to increase its cooling-surface and provide channels for the milk to flow in. The milk-strainer C constitutes the cover of the cone, being provided with a flange, $c$, which embraces or is embraced by a similar flange, $a'$, formed on the cone. In the former instance an outwardly-projecting shoulder, $a^2$, is formed on the cone, and in the latter instance an inwardly-projecting shoulder, $c^2$, is formed on the flange $c$ of the cover or strainer; or it may be formed in the body of the strainer, the object of projecting the shoulders being to prevent the passage of milk from the strainer into the cone. The bottom $c^3$ of the strainer is upwardly curved or convex to facilitate the drainage of milk therefrom. The cylindrical body of the strainer may be tapering or straight, and is provided near the bottom and extending nearly about the same with reticulated openings $c^4$. About the body of the strainer is a sleeve or hoop, D, the lower edge of which, at least, is adapted to snugly fit the body at the reticulated openings. To the sleeve D is secured a collar, $d$, of larger diameter than the sleeve, and adapted, when depressing upon the cone or the shoulder $a^2$ thereof, to fit snugly and prevent the passage of the milk from the strainer, whereby the cooling and straining may be interrupted at will, this being a secondary function of the sleeve and collar, the primary function of the same being that of a gage and deflector, respectively, for as the sleeve is more or less depressed over the openings $c^4$ more or less milk is prevented from passing therethrough, and that which does pass therethrough strikes against the inner surface of the collar, and is directed inwardly upon the cone and forms thereon an enveloping sheet or stream of milk, which adheres to and trickles or flows slowly down the outer surface of the same and into the can or vessel below. A refrigerative substance being within the cone cools the body thereof and absorbs animal heat from the milk while it is in contact with the outer surface thereof, and by the finely-divided condition of the milk and its simultaneous complete unobstructed exposure to the atmosphere deleterious odors are eliminated and evaporated.

Figure 3:
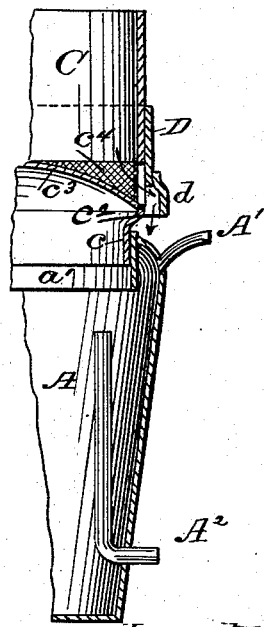

In Fig. 3 I illustrate an induction-pipe, A', and an eduction-pipe, A², whereby a continuous stream of water may be employed as the refrigerative substance.

It is apparent that the sleeve D alone will in a measure prevent milk from passing outwardly beyond the cone. Therefore I do not restrict myself to the partial necessity of employing the collar d.

The springs c⁵ are used in connection with a flaring strainer to hold the sleeve D in desired positions by friction.

Having described my invention and its operation, what I claim is—

1. The combination of an inverted cone-shaped refrigerating-chamber and a milk-strainer constructed as a cover to the same, and located and arranged to deliver milk therefrom against a flange and onto the outer surface of said chamber, substantially as and for the purpose set forth.

2. The combination of an inverted cooling-cone, a strainer surmounting the same, and a sliding gage or sleeve, substantially as specified.

3. The combination of a shipping-can, an inverted cooling-cone, and a strainer surmounting the cone, and constructed as a cover to the same, and arranged and located to deliver milk in a thin sheet, stream, or spray upon the outer surface of the cone, and means for regulating the flow of the milk, substantially as specified.

4. The combination of the cone A, provided with the arms a, the frame B, and the strainer C, provided with the sleeve D, substantially as shown and described.

5. The combination of the cone A and the strainer C, the latter provided with the openings c⁴ and convex bottom c³, substantially as shown and described.

6. The combination of the strainer C, sleeve D, and collar d, substantially as shown and described.

In testimony whereof I affix my signature in presence of two witnesses.

HENRY HAAK.

Witnesses:
 A. B. LANDIS,
 CURTIS FOESIG.